(12) United States Patent  
Kristan et al.

(10) Patent No.: US 9,334,546 B2  
(45) Date of Patent: May 10, 2016

(54) METHOD AND APPARATUS FOR TREATMENT OF A RAIL WELD

(75) Inventors: Joseph Victor Kristan, Pueblo, CO (US); Kenneth H. Reid, Pueblo, CO (US)

(73) Assignee: EVRAZ INC. NA CANADA, Regina (CA)

( * ) Notice: Subject to any disclaimer, the term of this patent is extended or adjusted under 35 U.S.C. 154(b) by 123 days.

(21) Appl. No.: 13/306,137

(22) Filed: Nov. 29, 2011

(65) Prior Publication Data

US 2013/0133784 A1 May 30, 2013

(51) Int. Cl.  
    *C21D 9/50* (2006.01)  
    *C21D 9/04* (2006.01)  
    *C21D 1/42* (2006.01)  
    *C21D 1/62* (2006.01)

(52) U.S. Cl.  
    CPC .. *C21D 1/42* (2013.01); *C21D 1/62* (2013.01); *C21D 9/04* (2013.01); *C21D 9/50* (2013.01); *C21D 2211/009* (2013.01); *Y02P 10/253* (2015.11)

(58) Field of Classification Search  
    CPC .............. C21D 9/04; C21D 9/50; C21D 1/62; C21D 1/42  
    USPC ........................................................ 148/526  
    See application file for complete search history.

(56) References Cited

U.S. PATENT DOCUMENTS

| 5,270,514 | A | 12/1993 | Wechselberger et al. | |
|---|---|---|---|---|
| 7,253,380 | B2 * | 8/2007 | Miller | 219/617 |
| 2004/0239317 | A1 | 12/2004 | Goldfine et al. | |
| 2005/0067381 | A1 | 3/2005 | Coomer | |
| 2005/0173419 | A1 | 8/2005 | Miller | |
| 2007/0007251 | A1 | 1/2007 | Kral et al. | |
| 2011/0297752 | A1 | 12/2011 | Keefe | |
| 2012/0015212 | A1 | 1/2012 | Karimine et al. | |

FOREIGN PATENT DOCUMENTS

| CA | 2222281 C | * | 2/2002 |
|---|---|---|---|
| JP | 10-12365 A | | 1/1998 |
| JP | 2001-105158 A | | 4/2001 |

OTHER PUBLICATIONS

Gutscher, Daniel; "Analysis of Thermite Welds in High Carbon Rail Steels" TTCI R&D Railway Track & Structures; Mar. 2011.  
The Metals Black Book; Chapter I, Introduction to the Metallurgy of Steel; pp. 48-51; CASTI Publishing Inc. copyright 1992.

(Continued)

*Primary Examiner* — Rebecca Lee  
(74) *Attorney, Agent, or Firm* — Pearne & Gordon LLP

(57) ABSTRACT

The present invention provides a rail weld treatment device for improving a resulting microstructure in and around an effected zone of a rail weld and of rails surrounding the rail weld. The device includes, but is not limited to a fixture clamping and centering assembly for engaging a rail head of a rail and a heating and cooling device connected with the fixture clamping and centering assembly to be positioned over the rail head. The fixture clamping and centering assembly comprises an engagement member which removably engages the rail head. The heating and cooling device includes a heating member for heating an effected zone of the rail weld and a cooling member for cooling the effected zone.

19 Claims, 7 Drawing Sheets

(56) References Cited

OTHER PUBLICATIONS

Image of Pearlite in a furnace cooled Fe-0.75C alloy. Picral etch. Magnification, 500x. Couresy of A.R. Marder and A. Benscoter, Bethlehem Steel Corp, Bethlehem, PA., taken from Steels Heat Treatment and Processing Principles, George Kraus, ASM International 1990.

Genkin, Z., "Welding and heat treatment of joints in railway rails in induction equipment", Welding International, vol. 19 No. 2, pp. 160-164, 2005.

Written Opinion and International Search Report issued on Mar. 11, 2013, by the US Patent Office as the International Searching Authority in corresponding International Patent Application No. PCT/US2012/065150.

* cited by examiner

METHOD AND APPARATUS FOR TREATMENT OF A RAIL WELD

BACKGROUND

Currently, with improvements in rail wear and rolling contact fatigue (RCF) performance, rail welds, both flash butt and thermite types have become a source of required maintenance for continuously welded rail used by modern railroads. A rail weld is a joint formed when welding two parent rails together. The production of the rail weld results in a fusion line, which is a location at which the opposing rails are fused or joined together. The production of the rail weld also results in a weld heat affected zone (HAZ) which is formed on either side of the fusion line and which has a microstructure varying from that of a pearlitic microstructure found in the parent rails. The non-pearlitic microstructure of the weld HAZ consists of degenerate pearlite or a sphereodized microstructure with inherently different mechanical properties from that of the parent rails. An initial evaluation of indicated weld defects from rail taken from in a track on the UP Railroad near North Platte, Nebr. confirmed that a weld HAZ, as shown in FIG. 1, and an inhomogeneity in microstructure and mechanical properties resulting from the presence of the weld HAZ is a factor in the formation of defects in and around a rail weld.

With reference to FIG. 1, a cross section of a single-pass weldment outlining a weld metal, or rail weld, formed between two rails is shown along with weld HAZ which surrounds the rail weld. Because of varying thermal conditions which occur as a function of distance from the rail weld, the weld HAZ can be composed of as many as four distinct regions: 1) a grain-coarsened-HAZ; 2) a grain-refined-HAZ; 3) an intercritical-HAZ, and 4) a subcritical HAZ. Each of these regions within the weld HAZ possesses microstructures and associated mechanical and physical properties that make each region unique.

In the grain-coarsened-HAZ region, peak temperatures reached during its formation range from approximately 2000 to 2700° F. (1090-1480° C.). Another way to describe this temperature range in metallurgical terms, is that it extends from much above an upper critical transformation temperature to below a solidus temperature of the rail. There are two main metallurgical conditions that occur in the grain-coarsened-HAZ region: 1) the microstructure is austenite, for the most part; and 2) since the austenite produced is much above the upper critical transformation temperature, grain growth may and often will occur. The amount of grain growth will depend on the peak temperature and time at that temperature, i.e. the higher the peak temperature and the longer the time at that temperature, the larger the austenite grains will grow.

Two significant metallurgical consequences result in the grain-coarsened-HAZ region: 1) since austenite is produced, the potential for transformation to martensite upon cooling exists, where martensite is not a desirable transformation product due to its lack of ductility, toughness, and susceptibility to cold cracking; and 2) as austenitic grain size grows, the resultant room temperature microstructure will be similarly affected, with low temperature notch (Charpy) toughness being significantly changed, i.e. the larger the grain size, the lower the notch toughness.

The sphereodized microstructure formed in the weld HAZ consists of spheres of cementite in a matrix of ferrite with a hardness up to 150 Brinell points less than in the parent rail, and specifically, in a heat treated premium rail. The sphereodized microstructures which are formed create weakened mechanical properties in the weld HAZ which results from heating and cooling regimes employed when forming the rail weld. It would be desirable to discover a rail weld treatment which can reduce or eliminate the undesirable microstructures formed in the weld HAZ in and around a rail weld.

SUMMARY

In one aspect, a rail weld treatment device for improving a resulting microstructure in and around an effected zone of a rail weld and of rails surrounding the rail weld, is provided. The device includes, but is not limited to a fixture clamping and centering assembly for engaging a rail head of a rail and a heating and cooling device connected with the fixture clamping and centering assembly to be positioned over the rail head. The fixture clamping and centering assembly comprises an engagement member which removably engages the rail head. The heating and cooling device includes a heating member for heating an effected zone of the rail weld and a cooling member for cooling the effected zone.

In one aspect, a method for treating a rail weld formed between a first and second rail, is provided. The method includes, but is not limited to, heating a portion of the rail weld subsequent to forming the rail weld from an initial temperature to an intermediate temperature which is higher than the initial temperature, and cooling the rail weld from the intermediate temperature to a final temperature so as to form a resulting pearlitic structure within the rail weld. The intermediate temperature is high enough to transform some of the material within the rail weld to austenite.

In one aspect, a method for treating an effected zone of a rail weld and of first and second rails surrounding the rail weld, is provided. The method includes, but is not limited to applying a rail weld treatment device around an outer surface of the rail weld, heating a portion of the rail weld using the weld treatment device from an initial temperature to an intermediate temperature which is higher than the initial temperature, cooling the rail weld from the intermediate temperature to a final temperature using the weld treatment device, and forming a resulting pearlitic structure within the rail weld. The intermediate temperature is high enough to transform some of the steel within the effected zone to austenite.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Methods and systems consistent with the present invention overcome the disadvantages of conventional rail welds by using a rail weld treatment device which is designed to improve the resulting microstructure and improve the mechanical properties in and around a rail weld. Preferably, the rail weld treatment device either reduces the size of weld HAZ immediately subsequent to welding or reheats an effected zone subsequent to welding in order to obtain improved homogeneity in the resulting microstructure in order to improve the mechanical properties in and around a rail weld. The treatment of the weld HAZ immediately subsequent to welding may be conducted through localized heating and cooling which may or may not include latent heat from when the rail weld was formed.

Figure 1:
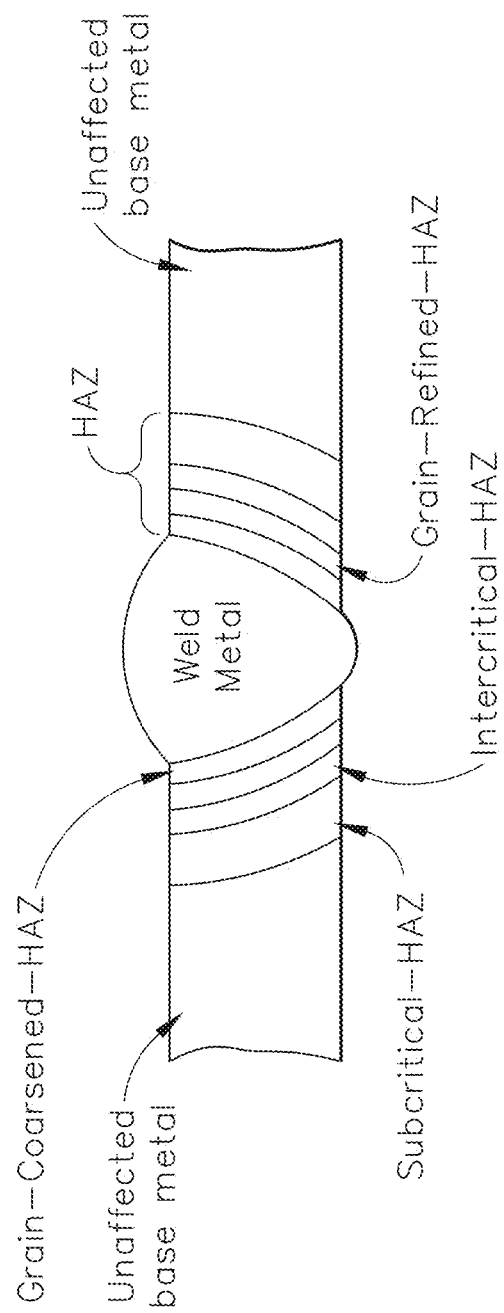
FIG. 1 depicts a cross-sectional view of a single-pass weldment outlining the weld metal and a weld HAZ.
Figure 2:
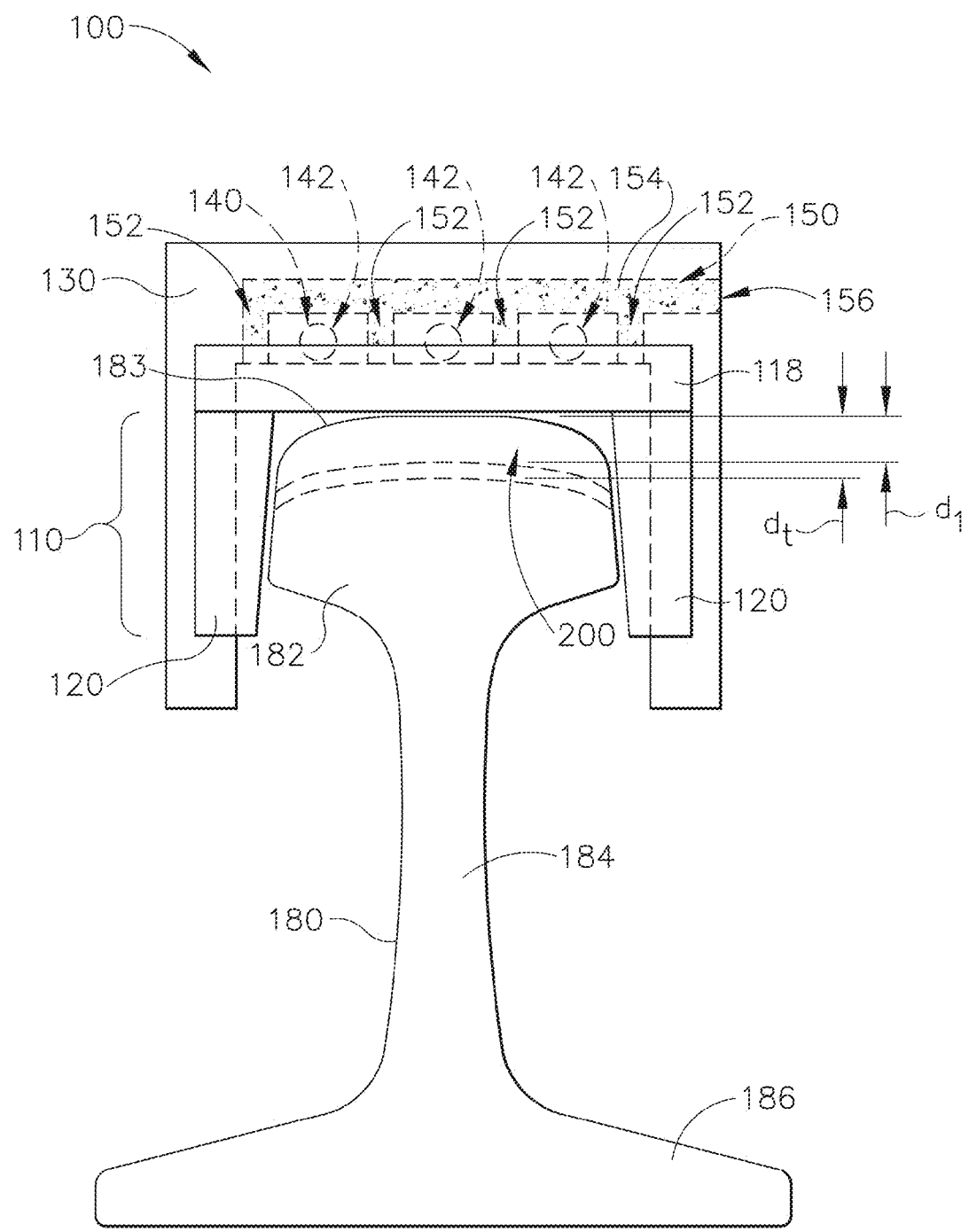
FIG. 2 depicts a side view of a first rail having a rail head and a rail weld treatment device removably engaged with the rail head, in accordance with one embodiment of the present invention.
Figure 3:
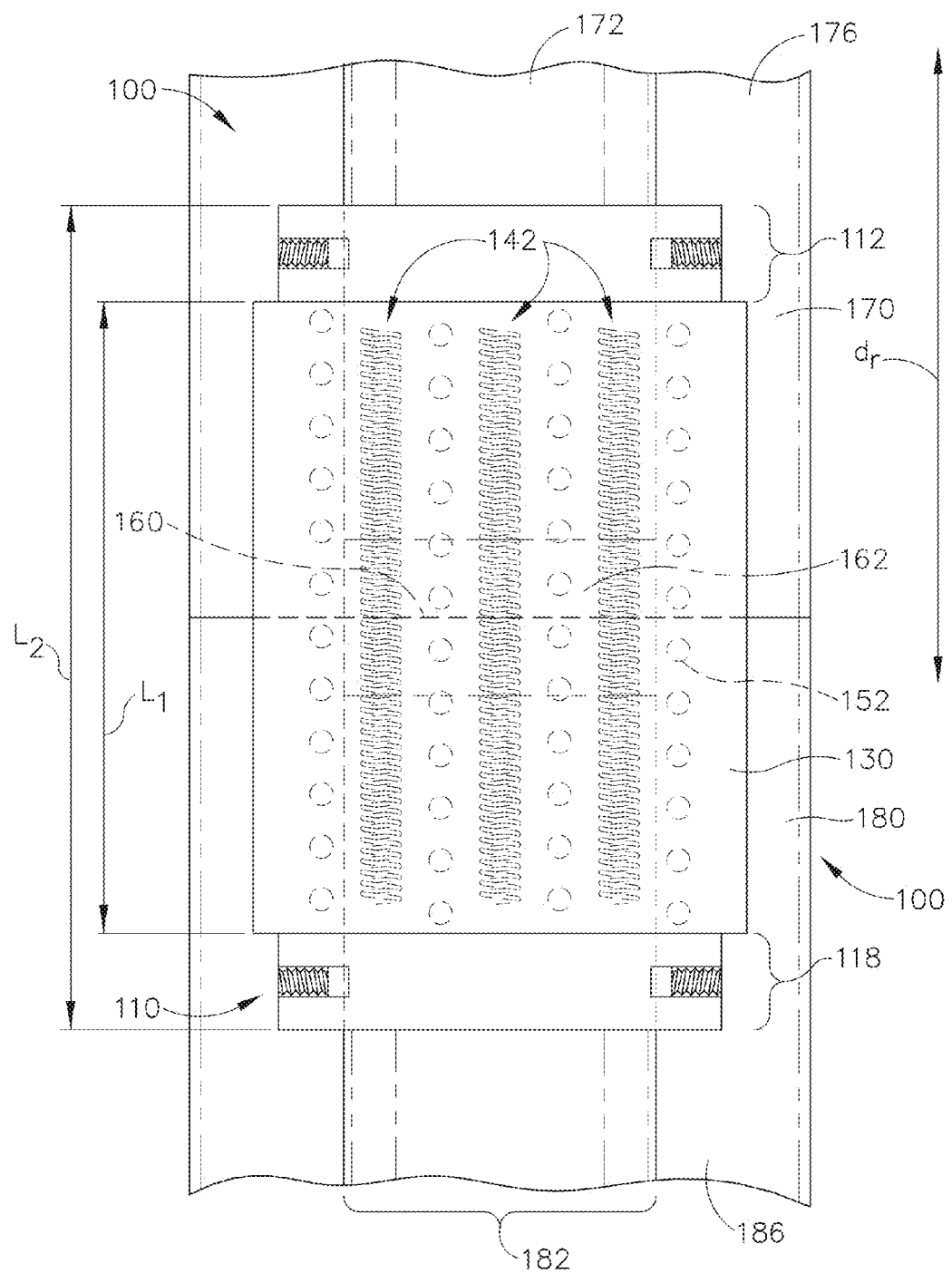
FIG. 3 depicts a top view of first and second rails having rail heads and a rail weld treatment device removably engaged with the rail heads, in accordance with one embodiment of the present invention.
Figure 5:
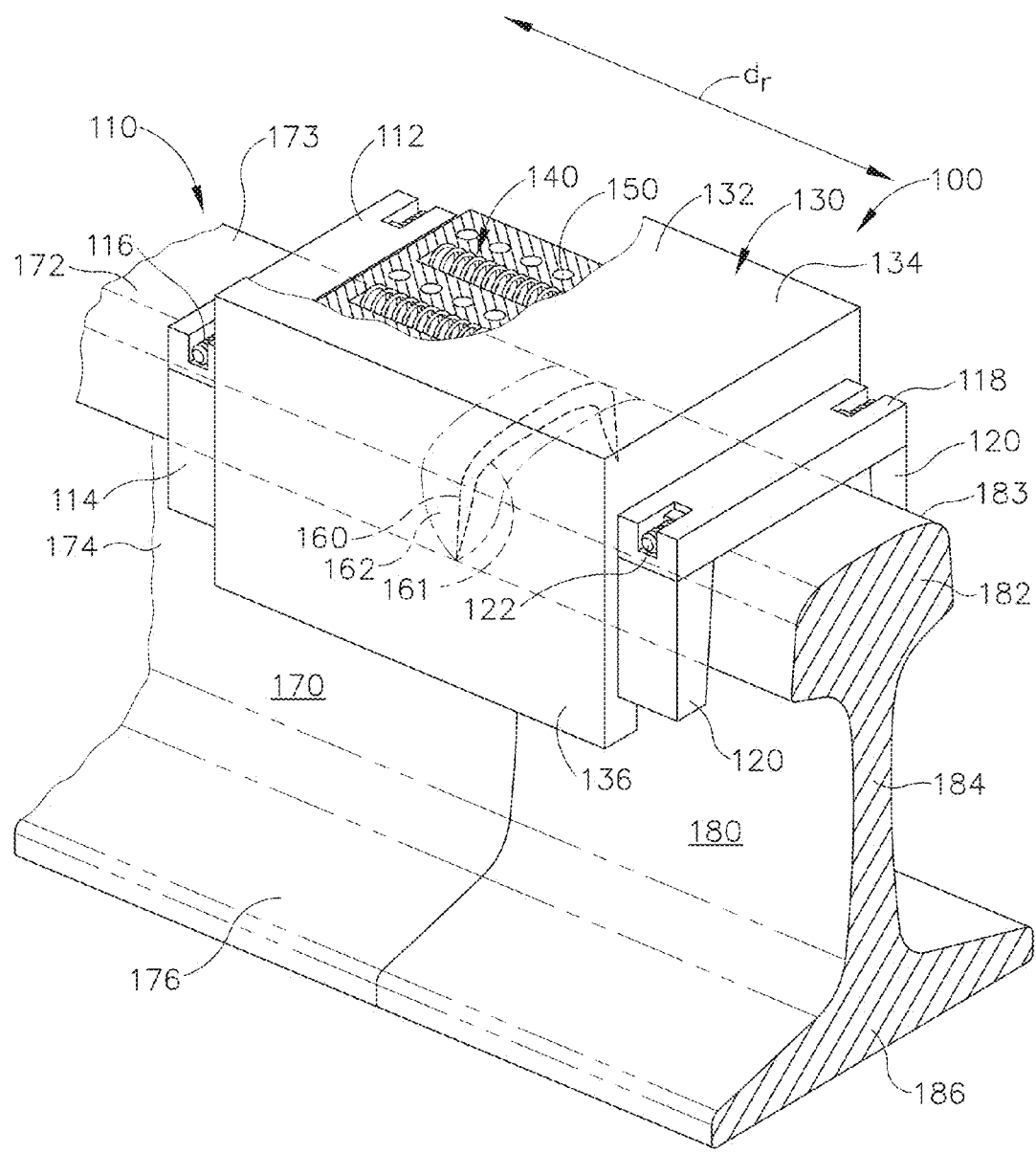
FIG. 5 depicts a perspective view of first and second rails having rail heads and a rail weld treatment device removably engaged with the rail heads, in accordance with one embodiment of the present invention.

With reference to FIGS. 2-3 and 5, there is shown a rail weld treatment apparatus 100 for improving a resulting microstructure and improving mechanical properties in and around a rail weld 160 formed between a first rail 170 and a second rail 180. First and second rails 170 and 180 form part of a track on a railway or railroad, also known as a permanent way, along with fasteners, sleepers and ballast, plus the underlying subgrade. Preferably, the rails 170, 180 are formed of a rail material, such as steel having a carbon content from 0.70 to 1.10 weight percent, and an iron content from 99.3 to 98.9 weight percent. Preferably, when forming the rails 170, 180, they are heated from a first temperature range from 0° C. to 700° C. to a second temperature range from 800° C. to 1350° C. in order to subsequently rapidly cool the region to form an austenitic microstructure. Upon heating the rails 170, 180 to the second temperature range, they are then cooled to a third temperature range from 700° C. to 20° C. in order to form a fine pearlitic microstructure.

Upon forming the rails, the rails are installed at a site in order to form part of a track on a railway or railroad. Upon installation, the rails 170, 180 are supported on tie (sleeper) plates which are supported by ties (sleepers), such as timber or pre-stressed concrete. The ties (sleepers) are laid on ballast, such as crushed stone and the fasteners fasten the rails 170, 180 to the ties (sleepers). The rails 170, 180 provide a track for a train or other railway vehicle to travel upon. Rails 170, 180 are subject to very high stresses and are preferably made of steel, and preferably, of very high-quality steel alloy produced using modern steelmaking practices which include vacuum degassing.

First rail 170 includes a rail head 172 having an outer surface 173 upon which wheels of a railway vehicle ride upon, a rail foot 176 which rests upon the tie plate and which is connected to the tie (sleeper) via fasteners, and a rail web 174 which connects the rail head 172 to the rail foot 176. Second rail 180 includes a rail head 182 having an outer surface 183 upon which wheels of a railway vehicle ride upon, a rail foot 186 which rests upon the tie plate and which is connected to the tie (sleeper) via fasteners, and a rail web 184 which connects the rail head 182 to the rail foot 186.

First rail 170 is connected to second rail 180 through rail weld 160. Rail weld 160 forms a joint between the first and second rails 170, 180. Rail weld 160 is formed by initially heating an area around where the first rail 170 connects with the second rail 180 to an initial temperature range from 1350° C. to 1550° C. in order to melt and fuse the first and second rails 170, 180 together.

Figure 4:
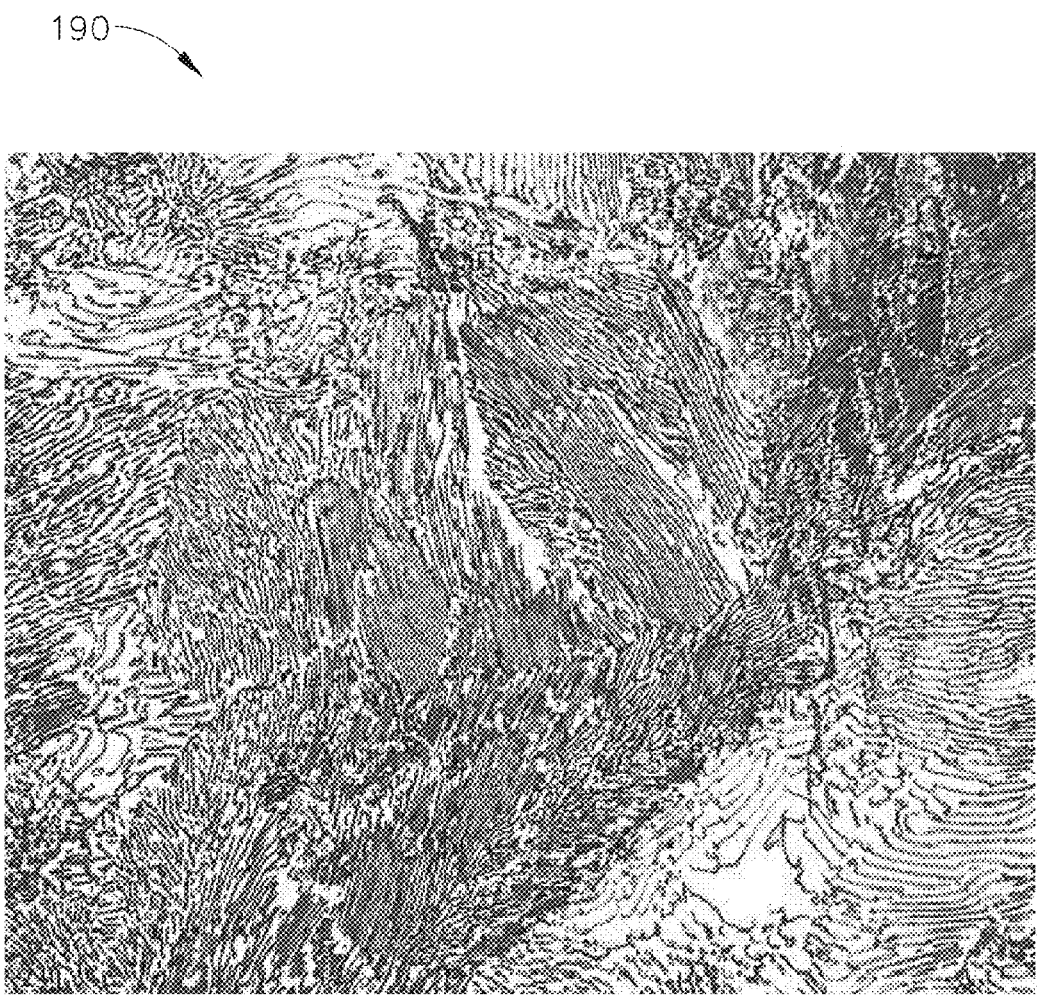
FIG. 4 depicts a magnified cross-sectional view of a coarse pearlite microstructure where the white portion of the microstructure is ferrite and the dark portion of the microstructure is cementite.
Figure 7:
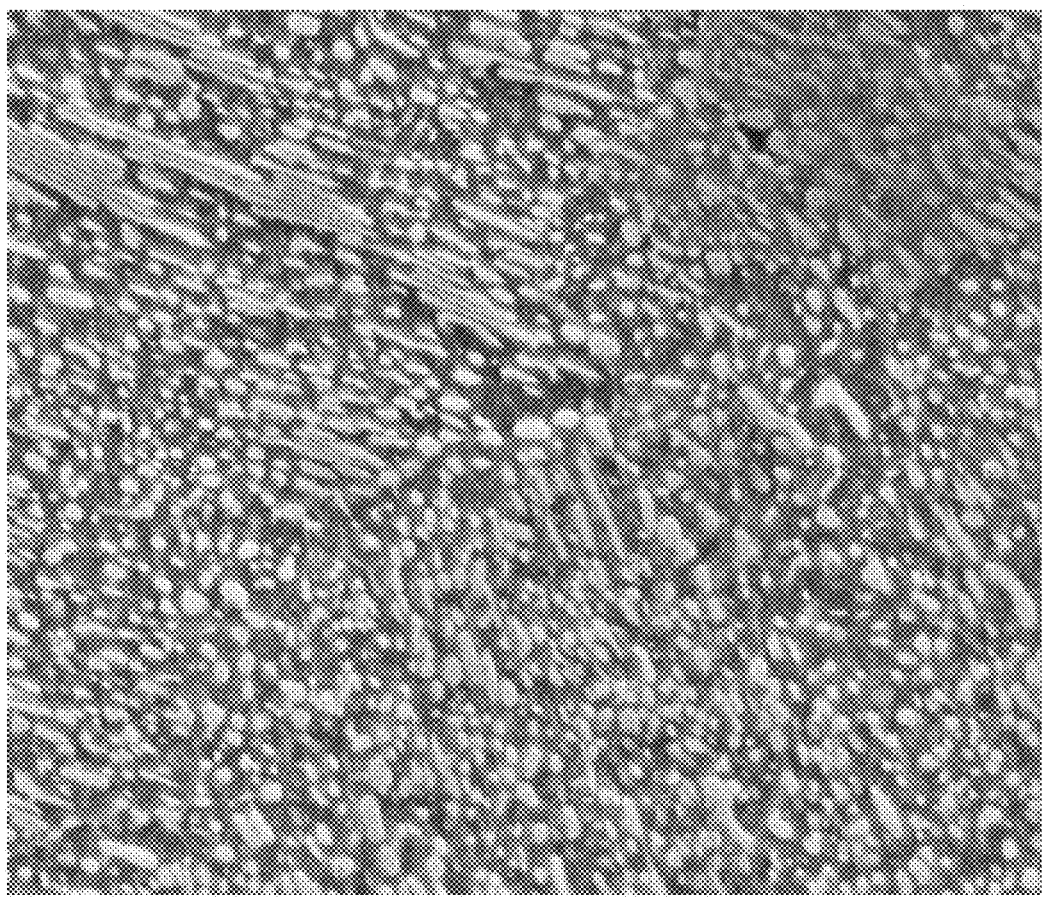
FIG. 7 depicts a magnified cross-sectional view of a sphereodized or degenerate pearlite microstructure from a weld HAZ of a rail weld.

Upon forming the rail weld 160, a weld HAZ 162 may be formed in and around the rail weld 160 which includes undesirable microstructures in the weld HAZ 162. Undesirable microstructure are any microstructure which weaken the mechanical properties of in the weld HAZ 162 when compared to the mechanical properties of the regions in the rails 170, 180 outside of the weld HAZ 162. Undesirable microstructures in the weld HAZ 162 and rail weld 160 include: a coarse pearlite microstructure, as depicted in FIG. 4; and a degenerate pearlite microstructure such as a sphereodized microstructure, as depicted in FIG. 7. Undesirable microstructures weaken the mechanical properties of the rail weld 160 and the weld HAZ 162 in portions of the rails 170, 180. The coarse pearlite microstructure has the same lamellar structure as a fine pearlite microstructure, with the only difference being the size of lamellae (length and width of the lamella).

The degenerative pearlite microstructure contains a change in the lamellae at which point they are no longer contiguous, such as the non-lamellae sphereodized microstructure depicted in FIG. 7. The non-lamellae sphereodized microstructure, or simply the sphereodized microstructure, consists of spheres of cementite in a matrix of ferrite with a hardness of up to 150 Brinell points less than surrounding regions of the first or second rails 170, 180, particularly in the strengthened regions of the rails 170, 180 that extend from outer surfaces 173, 183 of the rails 170, 180 to a depth $d_1$ below the outer surfaces 173, 183 of the rails 170, 180. The undesirable microstructures which may be formed weaken the mechanical properties in the rail weld 160 and the weld HAZ 162 by as much as 150 Brinell points less than the surrounding regions of the rails 170, 180, and may results from heating and cooling regimes employed when forming the rail weld 160.

Figure 6:
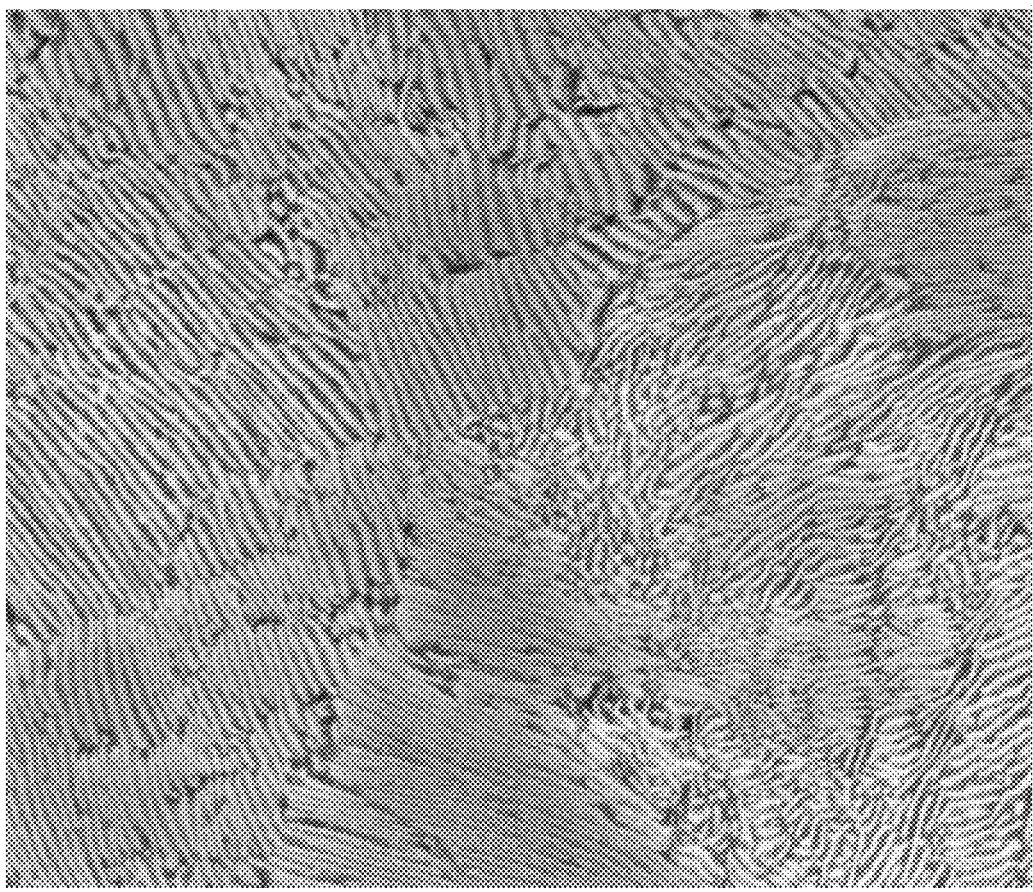
FIG. 6 depicts a magnified cross-sectional view of a fine pearlite microstructure where the white portion of the microstructure is ferrite and the dark portion of the microstructure is cementite.

Desirable microstructure are any microstructure which strengthen the mechanical properties of in the weld HAZ 162 so that they are equal to or greater than the mechanical properties of the regions in the rails 170, 180 outside of the weld HAZ 162. Desirable microstructures in the weld HAZ 162 and rail weld 160 include a fine pearlite microstructure, as depicted in FIG. 6, which is preferably consistent with the microstructure of surrounding regions of rails 170, 180, especially in strengthened regions of the rails 170, 180 that extend from outer surfaces 173, 183 of the rails 170, 180 to a depth $d_1$ below the outer surfaces 173, 183 of the rails 170, 180.

Interlamellar spacing appears to change continuously from coarse pearlite to fine pearlite as transformation temperatures of austenite to pearlite decrease to transformation curve noses. Preferably, the interlamellar spacing of fine pearlite, which is the spacing between lamellae, is less than 1 micron and preferably, less than 0.5 microns. At this amount of interlamellar spacing, the ferrite/cementite lamellae is no longer resolvable in a light microscope, and the fine pearlite in the light microscope looks uniformly black with no signs of parallel, alternating lamellae, as depicted in FIG. 6. Desirable microstructures have a hardness which is greater than, equal to, or no less than 150 Brinell points less than the hardness of surrounding regions of the first or second rails 170, 180, particularly in the strengthened regions of the rails 170, 180.

With reference to FIGS. 2, 3, and 5, the rail weld treatment apparatus 100 includes a fixture clamping and centering assembly 110 and a heating and cooling device 130 connected with the fixture clamping and centering assembly 110. The fixture clamping and centering assembly 110 engages the rail head 172 of the first rail 170 and/or the rail head 182 of the second rail 180. Preferably, the fixture clamping and centering assembly 110 removably and securely engages the rail head 172 and/or rail head 182 and provides the capability of centering, through the use of adjustment screws or similar devices, the heating and cooling device 130 over the rail weld 160 to provide a homogeneous heating and cooling treatment across the entire rail head treatment areas 172 and/or 182.

Preferably, the fixture clamping and centering assembly 110 includes a first engagement member 112 which removably engages the rail head 172 and preferably, a second engagement member 118, spaced apart from the first engagement member 112, which removably engages the rail head 182. The engagement members 112, 118 are any device which can removably attach and fixedly secure a first member, such as the heating and cooling device 130, to a second member, such as the rails 170, 180, and includes such devices as magnetic fasteners; mechanical couplings such as screws, clamps, springs, and pins; hydraulic couplings; and chemical fasteners such as glue. In one embodiment, each engagement member 112, 118 include a pair of engagement arms 114, 120 and an adjustment device 116, 122, respectively. Each engagement arm 114, 120 within the pair of engagement arms 114, 120 is positioned on opposite sides of the rail head 172, 182 and are designed to preferably clamp onto and against each respective rail head 172, 182 in order to securely fasten the fixture clamping and centering assembly 110 and the heating and cooling device 130 to the rails 170, 180. Preferably, adjustment devices 116, 122 provide the capability of moving each engagement arm 114, 120 within the pair of engagement arms 114, 120 either towards or away from a respective engagement arm 114, 120. Adjustment devices 116, 122 may include screws, levers, gears, or pins. The engagement arms 114, 120 may or may not be produced of a material and/or include cooling passages 150 so as to accelerate the cooling of the rail head 172, 182 to assist in the production of a fine pearlitic microstructure similar to the parent rail.

Heating and cooling device 130 is connected with the fixture clamping and centering assembly 110 and positioned over the rail heads 172, 182, and specifically the outer surfaces 173, 183 of the rail heads 172, 182. Preferably, the heating and cooling device 130 is positioned over the rail weld 160 formed in between the first and second rails 170, 180, preferably, over an outer surface 161 of the rail weld 160, and preferably over an effected zone 200. Preferably, the heating and cooling device 130 is located in between the pair of engagement members 112, 118. Preferably, the heating and cooling device 130 has a length $L_1$ from 50 mm to 400 mm, and more preferably from 75 mm to 375 mm, and most preferably from 100 mm to 300 mm. Preferably, the rail weld treatment device 100, including the heating and cooling device 130 and the fixture clamping and centering assembly 110, has an overall length $L_2$ from 70 mm to 500 mm, and more preferably from 100 mm to 450 mm, and most preferably from 150 mm to 400 mm.

With reference to FIG. 2, preferably, the heating member 140 directs heat towards, and the cooling member 150 directs a cooling fluid 154, towards an effected zone 200 of the rail weld 160 and the first and second rails 170, 180. Preferably, the effected zone 200 is centered around the rail weld 160 and extends in a rail direction $d_r$ away from the rail weld 160 both up and down the rails 170, 180, as shown in FIGS. 3 and 5. With reference to FIG. 2, the effected zone 200 also extends a first depth $d_1$ into the rails 170, 180. Preferably, the first depth $d_1$ is from 2 mm to 30 mm, and more preferably from 4 mm to 25 mm, and most preferably from 5 mm to 20 mm into the rails 170, 180. The effective zone 200 is the portion of the rail weld 160, and the rails 170, 180, which immediately subsequent to the formation of the rail weld 160 includes, consists of, or consists essentially of undesirable microstructures, as depicted in FIG. 7, which are formed, and which weakens the mechanical properties of the rail weld 160, the HAZ 162, and the first and second rails 170, 180.

The heating and cooling device 130 includes a heating member 140 for heating portions of the effected zone 200, the rail weld 160, the weld HAZ 162, and/or portions of the rails 170, 180, from an initial temperature to an intermediate temperature. Preferably, the heating member 140 is capable of heating the effected zone 200, the rail weld 160, the weld HAZ 162, and/or portions of the rails 170, 180 from an initial temperature to an intermediate temperature, where those portions of the HAZ 162 may include the outer surfaces 173, 183 and portions of the first and second rails 170, 180. Preferably, the heating member 140 is capable of heating the effected zone 200, the rail weld 160, the weld HAZ 162, and/or portions of the rails 170, 180 at a rate of 10° C./s to 500° C./s.

The initial temperature is the temperature of the effected zone 200, the rail weld 160, the weld HAZ 162, and/or portions of the rails 170, 180 either immediately subsequent to the formation of the rail weld 160 or subsequent the formation of the rail weld 160. At the initial temperature, the effected zone 200 includes, consists of, or consists essentially of undesirable microstructures which are formed, and which weaken the mechanical properties of the rail weld 160, the HAZ 162, and the first and second rails 170, 180. The initial temperature ranges preferably from 0° C. to 700° C., and more preferably from 20° C. to 500° C., and most preferably from 20° C. to 200° C.

The intermediate temperature is the temperature of the effected zone 200, the rail weld 160, the weld HAZ 162, and/or portions of the rails 170, 180 subsequent to applying heat to the effected zone 200, the rail weld 160, the weld HAZ 162, and/or portions of the rails 170, 180 from the heating member 140. At the intermediate temperature, the effected zone 200, the rail weld 160, the weld HAZ 162, and/or portions of the rails 170, 180 include, consist of, or consist essentially of austenite microstructures which are formed using the heating member 140, and which upon rapid cooling can strengthen the mechanical properties of the rail weld 160, the weld HAZ 162, and the first and second rails 170, 180. The intermediate temperature ranges preferably from 840° C. to 1300° C., and more preferably from 1000° C. to 1250° C., and most preferably from 1100° C. to 1250° C. The time immediately subsequent to the formation of the rail weld 160 varies preferably from 5 seconds to 600 seconds, and more preferably from 20 seconds to 500 seconds, and most preferably from 30 seconds to 300 seconds. The time subsequent to the formation of the rail weld 160 may take from 3600 or more seconds.

The heating member 140 may include any device which is capable of generating heat, such as: any electromagnetic heating device, including an induction coil; any fossil fuel based heating device, including a flame generating device, a burner, and a welder's torch, or any natural gas or gas based heating device; a microwave based heating device; any electrical heating device, such as an electric heater or an arc welder; or any device which is capable of =heating a fluid and/or directing that fluid towards another device. In one embodiment, the heating member 140 includes an induction coil 142, and preferably, a plurality of induction coils 142, possibly arranged along and/or perpendicular the rail direction $d_r$. By using induction coils 142, the amount of heat directed towards the effected zone 200, the rail weld 160, the weld HAZ 162, and/or portions of the rails 170, 180 may be precisely controlled and varied. Additionally, the required treatment time will be reduced in comparison to flame generating heating methodologies.

The heating and cooling device 130 also includes cooling member 150 for cooling portions of the effected zone 200, the rail weld 160, the weld HAZ 162, and/or portions of the rails 170, 180, from the intermediate temperature to a final temperature so as to form a resulting pearlitic structure within the effected zone 200, the rail weld 160, the weld HAZ 162, and/or portions of the rails 170, 180. Preferably, the cooling member 150 is capable of cooling the effected zone 200, the rail weld 160, the weld HAZ 162, and/or portions of the rails 170, 180 from the intermediate temperature to the final temperature, where those portions of the HAZ 162 may include the outer surfaces 173, 183 and portions of the first and second rails 170, 180.

With reference to FIG. 4, a sample photomicrograph of a pearlitic microstructure such as the one created by the present invention in the effected zone 200, including the rail weld 160, the weld HAZ 162, and/or portions of the rails 170, 180, upon cooling to the final temperature is shown. The white portions shown in FIG. 4 represent ferrite which is nearly pure iron, in regard to carbon content, while the black portions shown in FIG. 4 represent cementite, which have approximately 6.67 wt % of carbon.

The final temperature is the resulting temperature of the effected zone 200, the rail weld 160, the weld HAZ 162, and/or portions of the rails 170, 180 subsequent to cooling the effected zone 200, the rail weld 160, the weld HAZ 162, and/or portions of the rails 170, 180 with the cooling member 150. At the final temperature, the effected zone 200, the rail weld 160, the weld HAZ 162, and/or portions of the rails 170, 180 include, consist of, or consist essentially of a pearlitic microstructure which is formed upon using the cooling member 150, and which strengthen the mechanical properties of the rail weld 160, the weld HAZ 162, and the first and second rails 170, 180. The final temperature ranges preferably from 500° C. to 700° C., and more preferably from 400° C. to 600° C., and most preferably from 300° C. to 500° C.

The cooling member 150 may include any device which is capable of cooling another device, such as: any electromagnetic cooling device; any refrigerant based cooling device; any device which is capable of directing a cooled fluid towards another device, such as a valve, a channel, or a fan. In one embodiment, the cooling member 150 includes a channel 152, and preferably, a plurality of channels 152, preferably arranged along the rail direction $d_r$, and preferably arranged in between the induction coils 142, and which are directed towards the effected zone 200, the rail weld 160, the weld HAZ 162, and/or portions of the rails 170, 180. A cooling fluid 154 is forced through the channels 152 and directed towards the effected zone 200, the rail weld 160, the weld HAZ 162, and/or portions of the rails 170, 180. Preferably, the cooling fluid 154 enters the heating and cooling device 130 through an inlet 156 which may be connected to a fluid supply, such as a manifold for a compressed air supply, for example. The cooling fluid 154 may be any fluid whose temperature is less than the intermediate temperature, and preferably less than the final temperature. Preferably, the temperature of the cooling fluid 154 ranges from 0° C. to 200° C., and more preferably from 10° C. to 100° C., and most preferably from 20° C. to 50° C. Preferably, the cooling fluid 154 includes a gas and/or a liquid, such as, air, water, or an air and water mist mixture. By using channels 152 along with a cooling fluid 154, the rate of cooling of the effected zone 200 may be precisely controlled and varied.

With reference to FIGS. 2, 3 and 5, in operation, the rail weld treatment device 100, may be used to locally heat and subsequently cool portions of the effected zone 200, the rail weld 160, the weld HAZ 162, and/or portions of the rails 170, 180. Preferably, the rail weld treatment device 100 may be used to treat the rail weld 160 formed between a first rail 170 and second rail 180, along with other portions of the effected zone 200. Preferably, the rail weld treatment device 100 is used at the site or location upon which the rails 170, 180 are installed and preferably, after forming the rail weld 160. The method for treating the rail weld 160, along with other portions of the effected zone 200, may require from 30 seconds to 5 minutes, and preferably, from 30 seconds to 120 seconds, to perform based on an optimum depth $d_t$ of treatment below the outer surfaces 173, 183 of the rails 170, 180. Preferably, the optimum depth $d_t$ of treatment is greater than the first depth $d_1$, in order to fully encompass and treat the entire effected zone 200 beneath the outer surfaces 173, 183 of the rails 170, 180, however, the optimum depth $d_t$ of treatment may be equal to or less than the first depth $d_1$, whereby all of or only a portion the effected zone 200 is treated.

The method for treating the rail weld 160, along with other portions of the effected zone 200, begins by rapidly heating the rails 170, 180 and specifically, the effected zone 200, the rail weld 160, the weld HAZ 162, and/or portions of the rails 170, 180, from the initial temperature to the intermediate temperature, preferably by heat generated from the heating member 140, and preferably from induction coils 142. Preferably, the amount of time required to heat the effected zone 200, the rail weld 160, the weld HAZ 162, and/or portions of the rails 170, 180 from the initial temperature to the intermediate temperature is from 5 seconds to 60 seconds, and more preferably from 5 seconds to 30 seconds, and most preferably from 5 seconds to 20 seconds.

Preferably, the effected zone 200, the rail weld 160, the weld HAZ 162, and/or portions of the rails 170, 180 are heated from the initial temperature to the intermediate temperature, which is in an austentic range of the rail material from which the rails 170, 180 are comprised of, in order to form austenite, or austenitic material, in the rails 170, 180, and specifically, in the effected zone 200, the rail weld 160, the weld HAZ 162, and/or portions of the rails 170, 180. Preferably, the intermediate temperature is approximately from 800° C. to 1350° C., so as to avoid heat transfer to rail surface 173, 183 and rails 170, 180 immediately adjacent to the heating member 140, could negatively influence the microstructure of the adjacent rail steel by forming additional degenerate or spherodized microstructures.

The austenitic material formed in the rails 170, 180, and specifically, in the effected zone 200, the rail weld 160, the weld HAZ 162, and/or portions of the rails 170, 180 will then be cooled, preferably using air or an air/water mist, from the intermediate temperature to a final temperature, so as to form a fine pearlitic microstructure, as shown in FIG. 4, in the effected zone 200, the rail weld 160, the weld HAZ 162, and/or portions of the rails 170, 180, which is preferably consistent with the unaffected portions of the rails 170, 180 which are outside the effected zone 200. The cooling rate from the intermediate temperature to the final temperature may be modulated so as to or avoid any undesirable microstructures such as martensite or bainite, which may be formed from excessive cooling, or coarse pearlite, which may be formed from slow cooling. The formation of coarse pearlite results from slow cooling (annealing or normalizing) from the intermediate temperature while fine pearlite typically results from accelerated cooling. The rapid heating of the effected zone 200, the rail weld 160, the weld HAZ 162, and/or portions of the rails 170, 180 from the initial temperature to the intermediate temperature helps to minimize or eliminate formation of undesirable degenerative pearlite or sphereoized microstructures in the effected zone 200, the rail weld 160, the weld HAZ 162, and/or portions of the rails 170, 180 which could result from critical and/or subcritical heating of the rail material.

The heating of the effected zone 200, the rail weld 160, the weld HAZ 162, and/or portions of the rails 170, 180 from the initial temperature to the intermediate temperature may be accomplished with the heating member 140. The cooling of the effected zone 200, the rail weld 160, the weld HAZ 162, and/or portions of the rails 170, 180 from the intermediate temperature to the final temperature may be accomplished with the cooling member 150. The heating and cooling members 140, 150 may be combined into a single heating and cooling device 130, or they may be separate devices.

In one embodiment, the rail weld treatment device 100 is placed on or over the outer surfaces 173, 183 of the rails 170, 180, above the rail weld 160, and preferably centered above the rail weld 160 and the weld HAZ 162, in order to heat and cool the rails 170, 180. Upon placement of the rail weld treatment device 100 on or over the outer surfaces 173, 183, the rails 170, 180, and preferably, the effected zone 200, the rail weld 160, the weld HAZ 162, and/or portions of the rails 170, 180, the rail weld treatment device 100 is centered over the rail weld 160, heat is applied to the rails 170, 180 to heat portions of the rails 170, 180 from the initial temperature to the intermediate temperature, and a cooling is then applied to the rails 170, 180 to cool portions of the rails 170, 180 from the intermediate temperature to the final temperature.

Subsequent to the completion of the rail weld treatment, the rail weld treatment device 100 will be removed from the rails 170, 180 with no need for further intervention as no grinding of the rails 170, 180 should be required. The post treatment homogeneity in the effected zone 200 between the rail weld 160 and the weld HAZ 162 should better emulate that of homogeneity found in the rail material of the rails 170, 180 outside the effective zone 200, with no, or only an extremely small amount of, deviation in microstructure and mechanical properties from unaffected portions of the rails 170, 180 which are outside the effected zone 200.

Utilization of heating, preferably induction heating, locally, at the outer surfaces 173, 183 of the rails 170, 180 in combination with controlled cooling of those surfaces 173, 183, results in an effected zone 200 which is more homogenous with unaffected portions of the rails 170, 180 which are outside the effected zone 200. The present method for treating the rail weld 160, the weld HAZ 162, along with other portions of the effected zone 200, is designed to produce a significantly more homogeneous austenitic microstructure than that which may result from either flash-butt or thermite rail welding. The homogeneous austenitic microstructure produced by the present method within the effected zone 200 is control cooled in order to emulate production cooling rates utilized in the initial formation of the rails 170, 180. Preferably, the cooling rate is computer controlled to account for ambient conditions in order to effect approximately only the effected zone 200, at preferably the depth $d_t$ of treatment. The final resulting microstructure of the effected zone 200 will be significantly refined and more homogeneous with unaffected portions of the rails 170, 180 which are outside the effected zone 200 so as to provide improved mechanical properties and thus improved performance of the rails 170, 180 at and adjacent to the rail weld 160, including the weld HAZ 162.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A method for treating a pre-formed joint connecting a first end portion of a first rail head of a first rail to a first end portion of a second rail head of a second rail, wherein the pre-formed joint is provided by a rail weld that results in a weld heat affected zone in the first end portion of the first rail head and the first end portion of the second rail head, the method comprising the steps of:
   locally applying heat to targeted local portions of the rail weld and/or the weld heat affected zone to raise a temperature of heated material of the targeted local portions from an initial temperature to an intermediate temperature which is higher than the initial temperature, wherein the intermediate temperature is high enough to transform some of the heated material substantially to austenite, then;
   locally cooling the heated material of the targeted local portions from the intermediate temperature to a final temperature so as to form a resulting pearlitic structure within the targeted local portions of the rail weld and/or the weld heat affected zone that were locally heated to the intermediate temperature, wherein
   a temperature of rail head material of at least portions of regions of the first rail head and the second rail head outside of the rail weld and the weld heat affected zone is not raised high enough to transform some of the rail head material substantially to austenite.

2. The method of claim 1, wherein the resulting pearlitic structure is consistent with a pearlitic structure found in at least portions of the rail head material of the at least portions of the regions of the first rail head and the second rail head outside of the rail weld and the weld heat affected zone.

3. The method of claim 1, wherein the local cooling of the heated material includes flowing a media over an outer surface of the rail weld and/or an outer surface of the weld heat affected zone.

4. The method of claim 3, wherein the media is comprised of air, water, or some mixture of air and water.

5. The method of claim 1, wherein the local cooling is performed using a modulated cooling rate.

6. The method of claim 1, wherein the temperature of the heated material of the targeted local portions is raised from the initial temperature to the intermediate temperature at a rate of 10° C./s to 500° C./s.

7. The method of claim 1, wherein the treated portion extends from an outer surface of the rail weld and the weld heat affected zone to a depth of 2 mm to 30 mm.

8. The method of claim 1, wherein induction heating is used to locally apply heat to the targeted local portions.

9. The method of claim 1, wherein latent heat from the formation of the rail weld is used, in part, to achieve the intermediate temperature.

10. The method of claim 1, wherein the resulting pearlitic structure is generally homogenous with a pearlitic structure found in at least portions of the rail head material of the at least portions of the regions of the first rail head and the second rail head outside of the rail weld and the weld heat affected zone.

11. The method of claim 1, wherein the resulting pearlitic structure comprises a fine lamellar pearlite with an inter-lamellar spacing of less than 1 μm.

12. The method of claim 11, wherein the interlamellar spacing is less than 0.5 μm.

13. The method of claim 1, wherein the step of locally applying heat uses a heating member to locally apply heat to the targeted local portions, and wherein the step of locally cooling uses a cooling member to locally cool the heated material of the targeted local portions.

14. The method of claim 13, wherein the heating member is incorporated in a device including a length of from 50 mm to 400 mm, wherein the device is positioned such that the length of the device extends along a rail axis of the first end portion of the first rail head and the first end portion of the second rail head.

15. The method of claim 14, wherein the length of the device is from 75 mm to 375 mm.

16. The method of claim 15, wherein the length of the device is from 100 mm to 300 mm.

17. The method of claim 13, wherein the heating member is incorporated in a device, and the method further comprising the step of removably attaching the device with respect to the first end portion of the first rail head and the first end portion of the second rail head.

18. The method of claim 13, wherein the heating member is incorporated in a device, and the method further comprising the step of centering the device with respect to the first end portion of the first rail head and the first end portion of the second rail head.

19. The method of claim 1, wherein prior to the step of locally applying heat, material of the rail weld and/or the weld heat affected zone have a microstructure varying from a substantially pearlitic microstructure of at least portions of the rail head material of the at least portions of the regions of the first rail head and the second rail head outside of the rail weld and the weld heat affected zone, and wherein the resulting pearlitic structure provided after the step of locally cooling the heated material is consistent with the substantially pearlitic microstructure of the at least portions of the rail head material of the at least portions of the regions of the first rail head and the second rail head outside of the rail weld and the weld heat affected zone.

* * * * *